March 22, 1960 W. G. GIBSON ET AL 2,929,870
VIDEO SIGNAL COMPENSATING CIRCUITRY
Filed June 14, 1956

INVENTORS
Alfred C. Schroeder
& Walter G. Gibson
BY
ATTORNEY 2,929,870
Patented Mar. 22, 1960

2,929,870

VIDEO SIGNAL COMPENSATING CIRCUITRY

Walter Gold Gibson, Princeton, N.J., and Alfred Christian Schroeder, Huntington Valley, Pa., assignors to Radio Corporation of America, a corporation of Delaware Application June 14, 1956, Serial No. 591,493
16 Claims. (Cl. 178—7.1)

The invention relates to television systems, and it particularly pertains to improved circuit arrangements for compensating for loss of detail due to the finite dimensions of scanning electron bears and/or the leakage over the target electrodes, and/or for optical aberrations in such systems.

Due to the finite dimensions of the image signal producing and image reproducing electron beam spots there is appreciable loss of detail in image reproduction by the electronic television scanning process. In particular, because the scanning spot is of finite size, the light intensity over an appreciable area of the image is averaged so that fine detail within this area is effectively suppressed. Loss of detail is also incurred in those arrangements having a relatively large number of glass elements in the optical systems even where extensive steps have been taken to correct each element for the usual aberrations. The optical systems used in color television almost invariably fall into this class. Thus the television system acts as though it were an ideal system with low pass filtering of the finer detail, or the higher frequency components by which that detail is conveyed. Since there are two scanning spots, one at the image signal producing end and one at the image reproducing end, the total filtering action in the overall system is the equivalent of two separate filters in tandem.

Electronic television image signal producing tubes also exhibit a "leakage" effect over the target electrode whereby image information of an elemental picture area is also picked up as a component of the image signal from nearby elemental areas. In a sense each elemental area affects every other elemental area of the target electrode to some degree; the effect being less as the distance from the elemental area under consideration is increased.

Accordingly, for good detail in the reproduced image, it is important to compensate for the filtering and leakage effects. In black-and-white television as used in entertainment broadcasting today, the image orthicon tube is almost universally used and almost universally operated "over the knee" of the characteristic curve representing the performance of the tube. This type of operations tends to produce good "edge effects" in the black-and-white signal whereby the loss of detail due to the finite size of the electron beam and leakage is less noticeable than it would otherwise be. In both black-and-white and color television systems using photo-conductive tubes, such as the vidicon, however, there is little or none of the "edge sensitivity" characteristics found in the image orthicon. Therefore it is especially desirable with vidicon tubes, and the like, to compensate for loss of detail due to leakage. In color television systems, edge sensitivity is not obtainable with the image orthicon either because it must be operated over a more linear portion of the characteristic curve for good color signals. Therefore it is even more advantageous in color television broadcasting to compensate for loss of detail due to the finite dimensions of the scanning spot, leakage and for aberrations of the optical system.

Arrangements have been developed for producing a video signal compensated for loss of detail due to the finite size of the scanning spot, leakage and optical aberrations. One such system is illustrated and described in the copending U.S. patent application Serial No. 525,648 of Alda V. Bedford, filed August 1, 1955, now U.S. Patent No. 2,757,236, issued July 31, 1956, which contains an excellent discussion of the basic problem. Arrangements are illustrated and described in the copending U.S. patent application, Serial No. 587,360, filed May 25, 1956, by Alfred C. Schroeder and Walter G. Gibson jointly for "Video Signal Compensation," of which this application describes and represents improvements.

In the copending application of Schroeder and Gibson, Serial No. 587,360, there are shown arrangements for producing a video signal symmetrically compensated by subtracting from information in the line under consideration a predetermined portion of the information from the preceding and succeeding lines of the same field. In order to accomplish this, two delay lines are employed according to the invention represented by the copending application, Serial No. 587,360.

While not a serious problem, the use of two delay lines is not particularly advantageous and further simplification of the arrangements is desirable.

Arrangements requiring but one delay line for this purpose are shown and described in the copending U.S. patent application, Serial No. 591,205, filed June 13, 1956, by Walter G. Gibson for "Video Signal Compensating Circuits." In these described arrangements portions of the once delayed signals are mixed with the undelayed signals and reapplied to the single delay device to provide twice delayed secondary signals. As the signals circulate about the loop, some ringing is developed, and it is desirable that this ringing be avoided on general principles even though it is not intolerable.

An object of the invention is to provide an improved and simplified system for compensating for the loss of detail in electronic television systems without any ringing effects.

Another object of the invention is to provide a simplified and improved circuit arrangement for balanced compensation of a video signal for loss of detail due to the finite size of the scanning spot and leakage.

Fundamentally the loss in detail in the vertical direction in an interlaced television system is minimized by effectively compensating the information derived from the scanning of each raster line with information derived from the scanning of raster lines preceding and succeeding the raster line under consideration and in the same field therewith. Basically the compensation of the video signal is accomplished by delaying information obtained from the line previous to the line under consideration in the same field of the raster for a time substantially equal to the time required to scan two lines to form one secondary signal and by delaying the information obtained from the line under consideration for a time substantially equal to that required to scan one line to form the main signal. The delayed signals are then combined with the undelayed signal, forming the other secondary signal, in predetermined polarity and magnitude, to produce the desired compensated video signal in suitable form for controlling the operation of an image reproducing device. The necessary delays are introduced by passing the video signals through a single delay device once and twice as required to provide delay times of one and two times that required to scan one line. A single delay device is arranged to provide a delay of one line time for deriving the main signal and a portion of the main signal is again pressed through the single delay device for deriving one of the secondary signals, while the other secondary signal is derived from the undelayed signal.

According to the invention there is in addition to the signal delaying means, apparatus for transforming the signals to be passed in common channels to a form in which there will be no interaction and consequently no ringing.

One specific embodiment of the invention comprises apparatus for modulating the video signals to be delayed onto carrier waves generated in phase quadrature for application to the delaying device and apparatus for synchronously demodulating the delayed signals for recovering the main and secondary signals for combining with the other secondary signal. Another embodiment of the invention comprises apparatus for modulating the signals to be delayed onto carrier waves differing in frequency sufficiently to prevent interference between sidebands for application to the delaying device and apparatus for separating and demodulating the modulated carrier wave to recover the main and secondary signals for combining with the other secondary signal. More specifically, it is contemplated, according to the invention, that the combining apparatus may include means for inverting or reversing the polarity of one or more of the signals with respect to another and then attenuating or decreasing in magnitude the inverted signals to form secondary signals before combining with the main signal.

The arrangements according to the invention are readily adaptable for minimizing the loss of detail in both the horizontal and vertical directions by means of simple low pass filtering means interposed in the circuitry for developing the secondary signals. The attenuation of the higher frequency components effected by the low pass filter, is in effect inverted when the secondary signals are effectively subtracted from the main signal due to the reversal by the inverting means.

It should be understood that apparatus according to the invention may be embodied in the transmitting or receiving apparatus with equal effect. In most cases, it is probably preferable to incorporate the invention in the transmitter since in this manner, the advantages of the invention accrue to the televiewer using existing receiving apparatus without requiring any changes therein.

In order that the invention may be readily put to use and the advantages thereof fully realized, several embodiments of the invention are described hereinafter, by way of examples only, with reference to the accompanying drawing in which.

Figures 1, 2, 3:
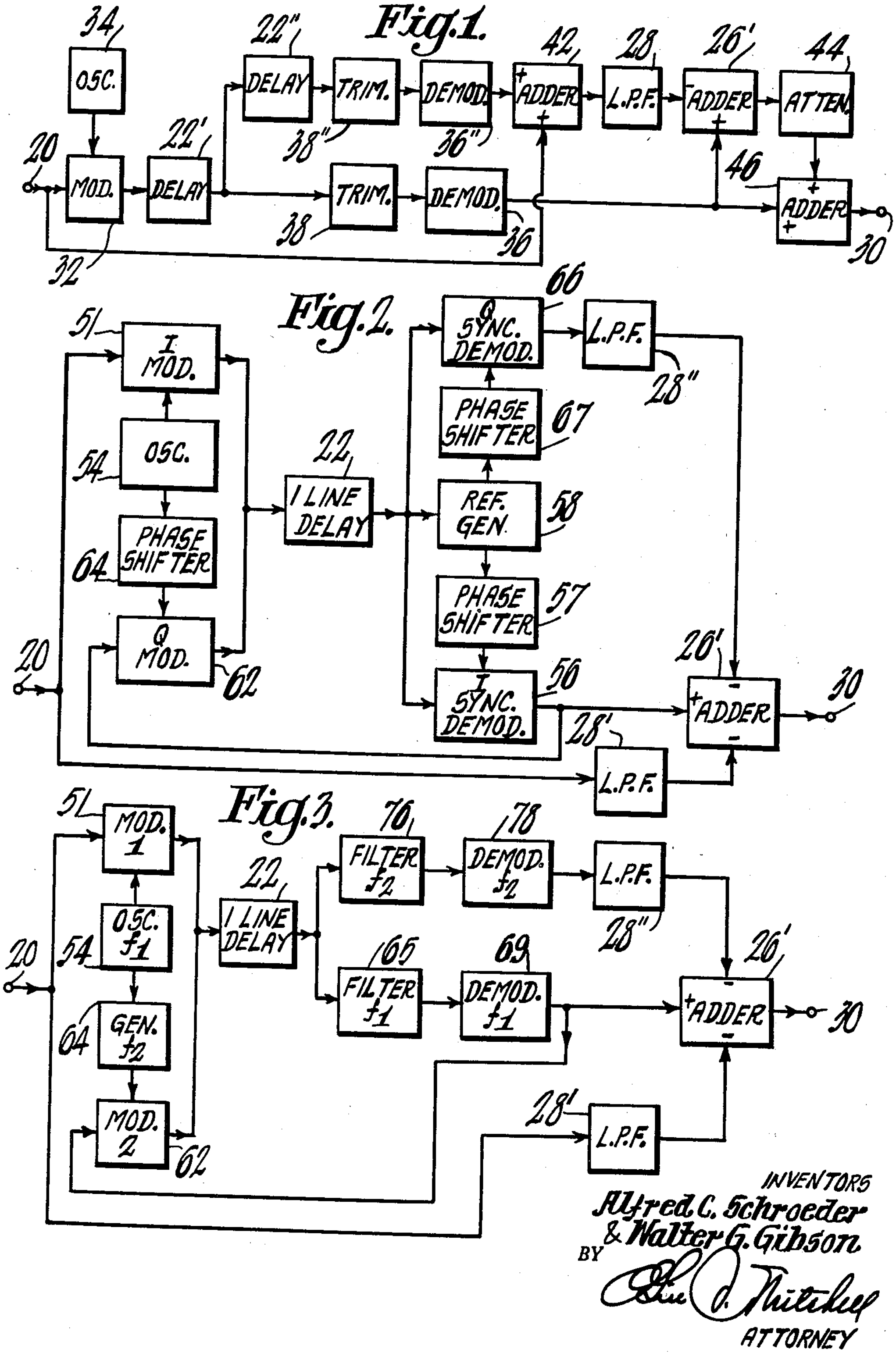
Fig. 1 is a functional diagram of an arrangement of the type shown and described in the copending U.S. patent application, Serial No. 587,360.
Fig. 2 is a functional diagram of an embodiment of the invention.
Fig. 3 is a functional diagram of a further embodiment of the invention.

Before describing the invention in detail, reference is made to the copending U.S. patent application, Serial No. 525,648, filed August 1, 1955, by Alda V. Bedford, now U.S. Patent No. 2,757,236, issued July 31, 1956, describing the manner in which vertical aperture loss arises in television systems.

With the general nature of the problem in mind, reference is made to Fig. 1 of the drawing showing the components of that part of a television system necessary to develop the compensated video signals in accordance with the fundamental principles set forth in the above mentioned copending U.S. patent application, Serial No. 587,360. Since the invention may be embodied in apparatus either at the transmitter or at one of the receivers, specific reference to either type of apparatus will be avoided. Video signals from a suitable source—such as a camera, or other pickup device, used at a transmitting station or the video signal demodulating portion of a television receiver, or other image reproducing apparatus—are applied at video signal input terminals 20. In any case, the video signals applied at the input terminals 20 are conventional and of the type which may be impressed upon an image reproducing device to form a raster having horizontal lines. A delay device 22' is coupled to the input terminals 20 to form a main signal by delaying the video signals for a time period substantially equal to that required to scan one line of the raster. The character of the delay device, insofar as the broad aspects of the invention are concerned is immaterial. If desired, it may be formed of lumped inductive and capacitive reactance circuit elements to constitute a conventional delay network. It is only necessary that a delay, including any delay inherent in the remainder of the circuitry, of the order of 63.5 microseconds be obtained over a frequency range of zero to as high as four mc./s. under present standards without undue frequency discrimination.

A number of delay devices suitable for the purpose are known in the art, among which are magnetic tape and wire recording systems, lumped capacitance-inductance networks, mercury column, and the graphecon type of cathode ray tube described in Patent No. 2,757,236 referred to in the foregoing or any other storage type tube. Another delay device suitable for the purpose is the quartz crystal storage and delay device which is advantageous in that it is compact despite the fact that it does require some, but relatively simple, auxiliary circuitry for operation.

The functional diagram of Fig. 1 illustrates the use of a quartz crystal delay device 22'. The video signal appearing at the input terminals 20, which ranges in frequency from zero to four mc./s. is applied to a modulating circuit 32 to which a locally generated sine wave obtained from an oscillating circuit 34 is also applied to produce a signal of suitable frequency range for application to a crystal delay device. The quartz crystal delay device 22' may be cut to provide a delay of exactly one line; however, in practice it is often desirable to cut the quartz crystal device 22' to delay the signal for a time slightly less than that required to scan one horizontal line, say for 62.0 microseconds and additional delay of adjustable nature is obtained by interposing a trimming delay device 38 in the circuit. Since the maximum delay of the trimming delay device 38 need be only of the order of a few, say 1.5, microseconds, conventional inductance-capacitance networks are entirely suitable. The trimming delay device 38 may precede the demodulating circuit 36, as shown, or if desired the trimming delay device may follow the demodulating device 36. It should also be understood that it is entirely within the realm of possibility that the total delay of the quartz crystal delay device 22' may be made adjustable over a final few microseconds range. The delayed video signal is restored to the original frequency range of 0–4 mc./s. by means of a demodulating circuit 36, which may be of conventional form, to form the main signal representing the line of the raster under consideration. One secondary signal is obtained after an additional delay of one line provided by a further quartz crystal delay device 22'' having the input circuit thereof connected to the output circuit of the initial quartz crystal delay device 22', a demodulating circuit 36'', and a trimming delay circuit 38''. Another secondary signal is obtained from the input terminals. The output of the demodulating circuit 36 is applied to one terminal of a combining, or algebraic adding, circuit 26', and the further delayed and the undelayed secondary signals appearing at the input terminals 20 may be directly applied to other terminals of the combining circuit 26', omitting the low pass filter 28. Essentially, the combining circuit 26' comprises means for effectively subtracting a portion of the combined secondary signal obtained from the adding circuit 42 from the main signal obtained from the initial demodulating circuit 36 to produce at the output of the adding circuit 26' a video signal compensated in the vertical direction. An attenuating circuit 44 and an output adding circuit 46 shown interposed between the combining circuit 26′ and the output terminals 30 may be used as suggested hereinafter.

It is contemplated that the combining circuit 26′ comprises components for attenuating the delayed video signal in a predetermined manner and for inverting the delayed video signals with respect to the erect video signal. Suitable attenuating components are well known to those skilled in the art, as are suitable polarity reversing devices, such as conventional controlled electron flow path devices. The remainder of the combining device 26′ may comprise a combining circuit of the type embodied in conventional television transmitters for adding video, blanking and synchronizing signals. A schematic diagram showing circuitry for performing the functions outlined in Fig. 1 may be found in the above mentioned copending U.S. patent application, Serial No. 587,360. In the arrangement of Fig. 1 as thus far described a portion of the information obtained at a given point in one line of a raster is subtracted from the information obtained at the corresponding point in the succeeding line of the same field of that raster from which a portion of the signal obtained from the succeeding line to be scanned in the same field is also subtracted, to produce at the output terminals 30 a modified video signal which is compensated suitably to overcome the loss of detail in the vertical direction due to the finite size of the scanning spot and/or to leakage.

To minimize the loss of detail in the horizontal direction, a low pass filter 28 is interposed in series between the two combining circuits 42 and 26′. The low pass filter 28 effectively attenuates the higher frequency components of the secondary signal and when the filtered secondary signal after appropriate attentuation is subtracted from the unfiltered main signal in the combining device 26′, to which the combined secondary signal may directly be applied, the high frequency components are effectively peaked. Peaking is effected by the increase in ratio of the high frequency components to the low frequency components brought about by subtracting the low frequency components from the signal in the combining device 26′.

The delay of one line is equivalent to peaking at an intermediate frequency of the video signal band. Although prior art teaching is to the effect that peaking is more important at the uppermost limits of the band, it has been found that better results are obtained with peaking beginning at much lower frequencies. Good results have been obtained in practice with peaking starting at very low frequencies, almost zero, and reaching substantially a maximum as low as one eighth of the highest frequency in the band and continuing substantially at that level for the remainder of the band. The low pass filter may be in conventional form comprising inductive and capacitive reactance elements. The cutoff frequency of the filters 28′ and 28″ depends on the scene televised, the type of camera used, and/or the conditions under which a given scene is televised. It may be described that the compensating apparatus be equipped with filters arranged so that the cutoff frequency can be varied for optimum compensation.

The degree of compensation, or the attenuation of the secondary signal, may be determined approximately by mathematical analysis of some complexity once certain fundamental assumptions are determined. In practice, however, the apparatus under consideration, that is the image orthicon, vidicon, or other pickup device and/or associated equipment, is difficult to analyze for the fundamental assumptions. Therefore, a strictly empirical approach is both satisfactory and realistic.

In practice, complete elimination of interfering effects is probably not possible and in some instances not even desirable. For example, it may be desirable to soften the image to some degree. Actually it is desirable to be able to change the degree of compensation with the scene to be televised, with the type of camera used, and with the conditions under which a given scene is televised with a given camera, and so on. One means for obtaining smooth control of the desired peaking is shown in Fig. 1 wherein an attenuator 44 and an output adding circuit 46 are connected to the output of the combining circuit 26′ and the demodulating circuit 36. The combining circuit 26′ in this arrangement is adjusted to subtract all of the low frequency components leaving the high frequency components to be added to the main signal in the adding circuit 46 as determined by adjusting the attenuator 44. In this manner a single attenuating element will provide all the control necessary to provide at the output terminals a video signal compensated in the vertical or both the vertical and horizontal directions to the degree desired.

A functional diagram of a signal compensating arrangement according to the invention requiring but a single device for delaying the video signals is shown in Fig. 2. The video signal appearing at the input terminals 20 is applied to a modulating circuit 51 which, in conjunction with a carrier wave generating circuit 54, is arranged to transform the video signal to a suitable band of frequencies for application to a guartz crystal delay device 22. The delayed video signals are recovered by means of a demodulating circuit 56, shown as being one of the synchronous type requiring a reference wave of proper phase determined by a phase shifter 57 coupled to a reference wave generator 58 operating at the same frequency as that of the carrier wave generated by the carrier wave generator 54. This generator 58 may be an injection locked oscillator, an oscillator operating under the control of a phase detector and a reactance tube, or other known generating circuit gated for controlling the output frequency in response to the information conveyed during the blanking and synchronizing intervals. With crystal delay devices 22 of the proper stability, the reference wave required for synchronous demodulation may be obtained from the carrier wave generator 54, if desired. The output of the synchronous demodulating circuit 56 constitutes the main signal for the line under consideration and is applied to a terminal of the algebraic adding circuit 26′. A secondary signal corresponding to the video signal appearing at input terminals 20 for the line preceding the line under consideration is obtained by accepting the information of the preceding line after passing through the delay device 22 an additional time. This is accomplished by applying the output of the main signal synchronous demodulating circuit 56 to another modulating circuit 62 to which the carrier wave from the carrier wave generating circuit 54 is applied to a phase shifting circuit 64 arranged to shift the phase of the carrier wave by 90 degrees, thereby placing the video signal modulated carrier wave in phase quadrature relationship for reapplication to the delay device 22. Because of the phase quadrature relationship there will be no interaction and consequently no ringing due to mixing of the signals in the delay device 22. The twice delayed signal is recovered by means of a synchronous demodulating circuit 66 to which a reference wave is applied by means of a phase shifting circuit 67 which is in phase quadrature relationship to the reference wave applied to the synchronous demodulating circuit 56.

As shown both of the modulated quadrature phase related carrier waves are applied to the same terminals of the delay device 22 and both of the demodulating circuits 56, 66 are connected to the other terminals. Since most delay devices are capable of translating energy in either direction with equal efficiency, it should be understood that it is contemplated within the scope of the invention that, if desired, one of the modulated carrier waves may be applied to the terminals opposite the terminals to which the other carrier wave is applied and the demodulating circuits are also connected to opposite terminals.

Another secondary signal representing information from the line succeeding the line under consideration is obtained directly from the input terminals 20. For compensation in the vertical direction only, the output of the quadrature phase synchronous demodulating circuit 66 and the secondary signal from the input terminals 20 are applied directly to the algebraic combining circuit 26' in such magnitude and polarity as to produce the desired signal in accordance with the teachings set forth above to produce a video signal at the output terminals 30 which is compensated in the vertical direction. Compensation in the horizontal direction is obtained by interposing low pass filters 28', and 28'' in the secondary signal paths as shown to provide peaking as described hereinbefore with reference to Fig. 1.

An alternate embodiment of the invention is shown in Fig. 3 wherein different carrier waves are employed to prevent interaction between the video signals to be delayed once and those signals to be delayed twice. In this embodiment the main signal is derived by applying the video signals appearing at the input terminals 20 to a modulating circuit 51 to which a carrier wave of given frequency, obtained from a carrier wave generating circuit 54, is also applied. The video signal modulated carrier wave is then applied to the delay device 22. The video signals are recovered by means of a bandpass filter 65 coupled to the delay device 22. The bandpass filter circuit 65 is arranged to pass substantially only the carrier wave of given frequency together with the attendant side bands to a demodulating circuit 69. The video signals are recovered at the output of the demodulating circuit 69 and applied to the algebraic combining circuit 26' as the main signal. A portion of the output of the demodulating circuit 69 is applied to another modulating circuit 62 to which a carrier wave of frequency different from the given frequency is applied for transforming the once delayed signals to a non-overlapping band of frequencies also suitable for application to the quartz crystal delay device 22. This carrier wave is obtained from a carrier wave generating circuit 64 which may be an oscillator producing a carrier wave of frequency entirely unrelated to the carrier wave of given frequency, or may be a harmonic generating circuit operating under control of the carrier wave generating circuit 64 to produce a carrier wave of harmonic relationship. The video modulated wave of different frequency is then applied to the delay device 22 and the twice delayed video frequency signal is recovered by means of another filtering circuit 76 and another demodulating circuit 78 to produce one secondary signal. The other secondary signal is again produced in response to video signals appearing at the input terminals 20, and the two secondary signals are applied to the algebraic combining circuit 26' as before. Also as indicated before, low pass filtering circuits 28' and 28'' may be interposed in the secondary signal paths, as shown, to provide correction in the horizontal direction.

If desired, synchronous demodulating circuit of the type shown in Fig. 1 may be used in the arrangement shown in Fig. 2 for recovering the delayed signals. Those skilled in the art will readily devise a pair of oscillator circuits or a harmonic reference wave generating system for the purpose.

It is further contemplated according to the invention that video signals may be passed through a single delay device 22 more than twice. One suggested circuit arrangement is that of Fig. 3 with added channels. Another is a combination of the arrangements shown in Figs. 2 and 3, wherein only three separated carrier frequencies are necessary. A further suggested arrangement is that of two quadriphase systems as indicated in Fig. 2 with the two carrier frequencies spaced to provide non-overlapping modulated carrier signals.

Circuitry for performing the invention outlined in the functional diagrams of Figs. 2 and 3 may be the same as for performing functions outlined in Fig. 1. Specific examples of all of the circuitry necessary for performing these desired functions may be obtained by referring to the above mentioned copending U.S. patent application, Serial No. 587,360, and those skilled in the art will readily determine the connections of the suggested generating, modulating, and demodulating circuitry necessary for the problem at hand.

The invention claimed is:

1. Apparatus to compensate for loss of detail in the direction normal to the direction of scanning in a television system including a source of video signals by which to reproduce an image in successive fields having interlaced horizontal lines including, means for generating a carrier wave, means coupled to said video signal source and to said generating means for modulating said carrier wave by the signal at said source, means coupled to said modulating means for delaying the modulated carrier wave by a time substantially equal to that required to scan one line, means coupled to said delaying means for demodulating said carrier wave to derive a main signal, other means for generating another carrier wave of characteristic different from the first said carrier wave, means coupled to said demodulating means and to said delaying means and to said other generating means for modulating a portion of said main signal onto said other carrier wave and for causing said other modulated carrier wave to traverse said delaying means, further means coupled to said delaying means for demodulating said other modulated carrier wave to derive a secondary signal, means coupled to said video signal source for deriving another secondary signal, and means for combining said main and said secondary signals in predetermined magnitude and polarity to produce a compensated video signal for subsequent application to an image reproducing device.

2. Apparatus to compensate for loss of detail in the direction normal to the direction of scanning as defined in claim 1, wherein said other carrier wave differs in phase from the first said carrier wave.

3. Apparatus to compensate for loss of detail in the direction normal to the direction of scanning as defined in claim 1, wherein said other carrier wave differs in frequency from the first said carrier wave.

4. Apparatus to compensate for loss of detail as defined in claim 1 and including means for compensating for loss of detail in the direction of scanning, said means comprising means interposed in the paths of said secondary signals for attenuating the higher frequency components of the signals in said paths.

5. Apparatus to compensate for loss in detail in the vertical direction in a television system including a source of video signals by which to reproduce an image in successive fields having interlaced horizontal lines, including a carrier wave generating circuit, a modulating circuit coupled to said generating circuit and to said source of video signals for modulating said carrier wave by said video signals, a delaying circuit having an input coupled to said modulating circuit for delaying the modulated carrier wave for a time substantially equal to that required for scanning one line and having an output, a demodulating circuit coupled to the output of said delaying circuit for recovering said video signals, another modulating circuit coupled to the input of said delaying circuit, means to apply a carrier wave of characteristic different from the carrier wave generated by the first said generating circuit to said other modulating circuit, means to apply at least a portion of said recovered signals to said other modulating circuit for modulating said other carrier wave by said recovered signals, another demodulating circuit coupled to the output of said delaying circuit for recapturing the delayed recovered video signals, a signal combining circuit coupled to said demodulating circuit and to said source of video signals for combining said video signals in predetermined magnitude and polarity to produce a compensated video signal for subsequent impression on an image reproducing device.

6. Apparatus to compensate for loss in detail in both the horizontal and vertical directions in a television system including a source of video signals by which to reproduce an image in successive fields having interlaced horizontal lines, including a carrier wave generating circuit, a modulating circuit coupled to said generating circuit and to said source of video signals for modulating said carrier wave by said video signals, a delaying circuit having an input coupled to said modulating circuit for delaying the modulated carrier wave for a time substantially equal to that required for scanning one line and having an output, a demodulating circuit coupled to the output of said delaying circuit for recovering said video signals, another modulating circuit coupled to the input of said delaying circuit, means to apply a carrier wave of characteristic different from the carrier wave generated by the first said generating circuit to said other modulating circuit, means to apply at least a portion of said recovered signals to said other modulating circuit for modulating said other carrier wave by said recovered signals, another demodulating circuit coupled to the output of said delaying circuit for recapturing the delayed recovered video signals, a low pass filtering circuit coupled to said other demodulating circuit, another low pass filtering circuit coupled to said source of video signals, a signal combining circuit coupled to the first said demodulating circuits and to said filtering circuits for combining said video signals in predetermined magnitude and polarity to produce a compensated video signal for subsequent impression on an image reproducing device.

7. Apparatus to compensate for loss of detail in the vertical direction in a television system including a source of video signals by which to reproduce an image on a raster of horizontal lines, said apparatus comprising a delay line having two sets of terminals and arranged to delay transmission of said video signals from one set of terminals to the other by a time substantially equal to the time required to scan one line of the raster, a generating circuit arranged for generating a carrier wave of given frequency, a modulating circuit connected between said generating circuit and a set of terminals of said delay line, means for applying said video signals to said modulating circuit, a synchronous demodulating circuit coupled to the other set of terminals of said delay line, a circuit arranged for producing a reference wave of the proper phase and frequency for application to said synchronous demodulating circuit, an algebraic adding circuit coupled to said synchronous demodulating circuit, another modulating circuit coupled between said synchronous demodulating circuit and one set of terminals of said delay line, a circuit arranged for generating a carrier wave of different characteristic from that of said carrier wave of given frequency and coupled to said other modulating circuit, another synchronous demodulating circuit coupled to the set of terminals of said delay line other than said one set, a circuit coupled to said other synchronous demodulating circuit for supplying a reference wave of the proper phase and frequency to said other demodulating circuit, connections between said other demodulating circuit and said algebraic adding circuit, and connections between said source of video signals and said algebraic adding circuit, thereby to produce compensated video signals for subsequent application to an image reproducing device.

8. Apparatus to compensate for loss of detail in both the horizontal and vertical directions in a television system including a source of video signals by which to reproduce an image on a raster of horizontal lines, said apparatus comprising a delay line having two sets of terminals and arranged to delay transmission of said video signals from one set of terminals to the other by a time substantially equal to the time required to scan one line of the raster, a generating circuit arranged for generating a carrier wave of given frequency, a modulating circuit connected between said generating circuit and a set of terminals of said delay line, means for applying said video signals to said modulating circuit, a synchronous demodulating circuit coupled to the other set of terminals of said delay line, a circuit arranged for producing a reference wave of the proper phase and frequency for application to said synchronous demodulating circuit, an algebraic adding circuit coupled to said synchronous demodulating circuit, another modulating circuit coupled between said synchronous demodulating circuit and one set of terminals of said delay line, a circuit arranged for generating a carrier wave of different characteristic from that of said carrier wave of given frequency and coupled to said other modulating circuit, another synchronous demodulating circuit coupled to the set of terminals of said delay line other than said one set, a circuit coupled to said other synchronous demodulating circuit for supplying a reference wave of the proper phase and frequency to said other demodulating circuit, connections including a low pass filtering circuit between said other demodulating circuit and said algebraic adding circuit, and connections including a low pass filtering circuit between said source of video signals and said algebraic adding circuit, thereby to produce compensated video signals for subsequent application to an image reproducing device.

9. Apparatus to compensate for loss of detail in the vertical direction in a television system including a source of video signals by which to reproduce an image on a raster of horizontal lines, said apparatus comprising a delay line having two sets of terminals and arranged to delay transmission of said video signals from one set of terminals to the other by a time substantially equal to the time required to scan one line of the raster, a generating circuit arranged for generating a carrier wave of given frequency, a modulating circuit connected between said generating circuit and a set of terminals of said delay line, means for applying said video signals to said modulating circuit, a synchronous demodulating circuit coupled to the other set of terminals of said delay line, a circuit arranged for producing a reference wave of said given frequency for application to said synchronous demodulating circuit, an algebraic adding circuit coupled to said synchronous demodulating circuit, another modulating circuit coupled between said synchronous demodulating circuit and one set of terminals of said delay line, a circuit coupled to said generating circuit for producing a carrier wave of phase quadrature relationship to that of said carrier wave of given frequency and coupled to said other modulating circuit, another synchronous demodulating circuit coupled to the set of terminals of said delay line other than said one set, a circuit coupled to said other synchronous demodulating circuit for supplying a reference wave of phase quadrature relationship to first said reference wave, connections between said other demodulating circuit and said algebraic adding circuit, and connections between said source of video signals and said algebraic adding circuit, thereby to produce compensated video signals for subsequent application to an image reproducing device.

10. Apparatus to compensate for loss of detail in both the horizontal and vertical directions in a television system including a source of video signals by which to reproduce an image on a raster of horizontal lines, said apparatus comprising a delay line having two sets of terminals and arranged to delay transmission of said video signals from one set of terminals to the other by a time substantially equal to the time required to scan one line of the raster, a generating circuit arranged for generating a carrier wave of given frequency, a modulating circuit connected between said generating circuit and a set of terminals of said delay line, means for applying said video signals to said modulating circuit, a synchronous demodulating circuit coupled to the other set of terminals of said delay line, a circuit arranged for producing a reference wave of said given frequency for application to said synchronous demodulating circuit, an algebraic adding circuit coupled to said synchronous demodulating circuit, another modulating circuit coupled between said synchronous demodulating circuit and one set of terminals of said delay line, a circuit coupled to said generating circuit for producing a carrier wave of phase quadrature relationship to said carrier wave of given frequency and coupled to said other modulating circuit, another synchronous demodulating circuit coupled to the set of terminals of said delay line other than said one set, a circuit coupled to said other synchronous demodulating circuit for supplying a reference wave of phase quadrature relationship to the first said reference wave, connections including a low pass filtering circuit between said other demodulating circuit and said algebraic adding circuit, and connections including a low pass filtering circuit between said source of video signals and said algebraic adding circuit, thereby to produce compensated video signals for subsequent application to an image reproducing device.

11. Apparatus to compensate for loss of detail in the vertical direction in a television system including a source of video signals by which to reproduce an image on a raster of horizontal lines, said apparatus comprising a delay line having two sets of terminals and arranged to delay transmission of said video signals from one set of terminals to the other by a time substantially equal to the time required to scan one line of the raster, a generating circuit arranged for generating a carrier wave of given frequency, a modulating circuit connected between said generating circuit and a set of terminals of said delay line, means for applying said video signals to said modulating circuit, a synchronous demodulating circuit coupled to the other set of terminals of said delay line, a reference wave generating circuit coupled to said other set of terminals of said delay line and arranged for generating a reference wave of said given frequency, a phase shifting circuit connected between said reference wave generating circuit and said synchronous demodulating circuit, an algebraic adding circuit coupled to said synchronous demodulating circuit, another modulating circuit coupled between said synchronous demodulating circuit and one set of terminals of said delay line, a circuit coupled between said carrier wave generating circuit and said other modulating circuit for shifting said carrier wave in phase quadrature, another synchronous demodulating circuit coupled to the set of terminals of said delay line other than said one set, another phase shifting circuit coupled between said reference wave generating circuit and said other synchronous demodulating circuit, connections between said other demodulating circuit and said algebraic adding circuit, and connections between said source of video signals and said algebraic adding circuit, thereby to produce compensated video signals for subsequent application to an image reproducing device.

12. Apparatus to compensate for loss of detail in both the horizontal and vertical directions in a television system including a source of video signals by which to reproduce an image on a raster of horizontal lines, said apparatus comprising a delay line having two sets of terminals and arranged to delay transmission of said video signals from one set of terminals to the other by a time substantially equal to the time required to scan one line of the raster, a generating circuit arranged for generating a carrier wave of given frequency, a modulating circuit connected between said generating circuit and a set of terminals of said delay line, means for applying said video signals to said modulating circuit, a synchronous demodulating circuit coupled to the other set of terminals of said delay line, a locked oscillator circuit coupled to said other set of terminals of said delay line and arranged for generating a reference wave of said given frequency, a phase shifting circuit connected between said locked oscillator and said synchronous demodulating circuit, an algebraic adding circuit coupled to said synchronous demodulating circuit, another modulating circuit coupled between said synchronous demodulating circuit and one set of terminals of said delay line, a circuit coupled between said locked oscillator and said other modulating circuit for shifting said carrier wave in phase quadrature, another synchronous demodulating circuit coupled to the set of terminals of said delay line other than said one set, another phase shifting circuit coupled between said locked oscillator and said synchronous demodulating circuit, a low pass filtering circuit between said other demodulating circuit and said algebraic adding circuit, and a low pass filtering circuit between said source of video signals and said algebraic adding circuit, thereby to produce compensated video signals for subsequent application to an image reproducing device.

13. Apparatus to compensate for loss of detail in the vertical direction in a television system including a source of video signals by which to reproduce an image on a raster of horizontal lines, said apparatus comprising a delay line having two sets of terminals and arranged to delay transmission of said video signals from one set of terminals to the other by a time substantially equal to the time required to scan one line of the raster, a generating circuit arranged for generating a carrier wave of given frequency, a modulating circuit connected between said generating circuit and a set of terminals of said delay line, means for applying said video signals to said modulating circuit, a filtering circuit coupled to the other set of terminals of said delay line, a filtering circuit for limiting the response to the signal modulated carrier wave of given frequency, a demodulating circuit coupled to said filtering circuit, an algebraic adding circuit coupled to said demodulating circuit, another modulating circuit coupled between said demodulating circuit and one set of terminals of said delay line, a circuit arranged for generating a carrier wave of different frequency from said given frequency and coupled to said other modulating circuit, another filtering circuit coupled to the set of terminals of said delay line other than said one set for limiting the response to the signal modulated wave of different frequency, a demodulating circuit coupled to said other filtering circuit, connections between said other demodulating circuit and said algebraic adding circuit, and connections between said source of video signals and said algebraic adding circuit, thereby to produce compensated video signals for subsequent application to an image reproducing device.

14. Apparatus to compensate for loss of detail in both the horizontal and vertical directions in a television system including a source of video signals by which to reproduce an image on a raster of horizontal lines, said apparatus comprising a delay line having two sets of terminals and arranged to delay transmission of said video signals from one set of terminals to the other by a time substantially equal to the time required to scan one line of the raster, a generating circuit arranged for generating a carrier wave of given frequency, a modulating circuit connected between said generating circuit and a set of terminals of said delay line, means for applying said video signals to said modulating circuit, a band pass filtering circuit coupled to the other set of terminals of said delay line for limiting transmission to the video signal modulated wave of given frequency, a demodulating circuit coupled to said filtering circuit, an algebraic adding circuit coupled to said demodulating circuit, another modulating circuit coupled between said synchronous demodulating circuit and one set of terminals of said delay line, a circuit arranged for generating a carrier wave of frequency different from said given frequency and coupled to said other modulating circuit, another filtering circuit coupled to the set of terminals of said delay line other than one set for limiting transmission to the video signal modulated wave of different frequency, a demodulating circuit coupled to said other filtering circuit, a low pass filtering circuit connected between said other demodulating circuit and said algebraic adding circuit, and another low pass filtering circuit connected between said source of video signals and said algebraic adding circuit, thereby to produce compensated video signals for subsequent application to an image reproducing device.

15. In a television system including a source of video signals and in which said video signals are to be impressed subsequently upon an image reproducing device in parallel lines, apparatus to compensate for loss of detail in a direction perpendicular to said lines, said apparatus comprising means coupled to said video signal source for delaying said signals for a time substantially equal to that required to scan one line, a signal combining circuit coupled to said video signal source and to the output of said signal delaying means for combining the signal thereat and said undelayed signal in predetermined polarity and magnitude, means coupled between the output and the input of said delaying means for additionally delaying said signals for a time substantially equal to that required to scan one line, and means coupled between the output of said delaying means and said combining circuit for combining the additionally delayed signal in predetermined magnitude and polarity to produce a compensated video signal for subsequent impression upon said image-reproducing device.

16. Apparatus to compensate for loss of detail in the vertical direction in a television system including a source of video signals by which to reproduce an image on a raster of horizontal lines, said apparatus comprising a delay line having two sets of terminals and arranged to delay transmission of said video signals from one set of terminals to the other by a time substantially equal to the time required to scan one line of the raster, a generating circuit arranged for generating a carrier wave of given frequency, a modulating circuit connected between said generating circuit and a set of terminals of said delay line, means for applying said video signals to said modulating circuit, a filtering circuit coupled to the other set of terminals of said delay line, a filtering circuit for limiting the response to the signal modulated carrier wave of given frequency, a demodulating circuit coupled to said filtering circuit, an algebraic adding circuit coupled to said demodulating circuit, another modulating circuit coupled between said demodulating circuit and one set of terminals of said delay line, a circuit arranged for generating a carrier wave of frequency harmonically related to said given frequency and coupled to said other modulating circuit, another filtering circuit coupled to the set of terminals of said delay line other than said one set for limiting the response to the signal modulated wave of different frequency, a demodulating circuit coupled to said other filtering circuit, connections between said other demodulating circuit and said algebraic adding circuit, and connections between said source of video signals and said algebraic adding circuit, thereby to produce compensated video signals for subsequent application to an image reproducing device.

References Cited in the file of this patent

UNITED STATES PATENTS 2,757,236 Bedford ---------------- July 31, 1956